United States Patent [19]
Akazawa et al.

[11] Patent Number: 5,176,314
[45] Date of Patent: Jan. 5, 1993

[54] EASILY OPENABLE SEALED CONTAINER

[75] Inventors: Seigo Akazawa; Tadao Takagaki, both of Yokohama, Japan

[73] Assignee: Sumitomo Bakelite Company Limited, Tokyo, Japan

[21] Appl. No.: 629,907

[22] Filed: Dec. 19, 1990

[30] Foreign Application Priority Data

| | | |
|---|---|---|
| Dec. 25, 1989 [JP] | Japan | 1-337571 |
| Feb. 19, 1990 [JP] | Japan | 2-010220 |
| Mar. 30, 1990 [JP] | Japan | 2-080968 |
| Mar. 30, 1990 [JP] | Japan | 2-080969 |
| May 10, 1990 [JP] | Japan | 2-118771 |

[51] Int. Cl.⁵ ............................................. B66D 43/14
[52] U.S. Cl. ............................... 229/125.35; 229/123.1; 229/246
[58] Field of Search ........... 229/123.1, 123.2, 125.33, 229/125.35, 246; 220/359; 215/232

[56] References Cited

U.S. PATENT DOCUMENTS

| | | | |
|---|---|---|---|
| 3,547,338 | 12/1970 | Hemmes | 229/123.1 |
| 3,783,089 | 1/1974 | Hurst et al. | 229/123.1 |
| 4,000,816 | 1/1977 | Spruyt | 220/359 |
| 4,381,848 | 5/1983 | Kahn | 229/123.2 |
| 4,636,273 | 1/1987 | Wolfersperger | 220/359 |
| 4,693,390 | 9/1987 | Hekal | 229/123.1 |
| 4,715,528 | 12/1987 | Kjelgaard | 220/359 |
| 4,771,937 | 9/1988 | Kamada et al. | 229/125.33 |
| 4,857,369 | 8/1989 | Oehlenschlaeger et al. | 215/232 |
| 4,865,217 | 9/1989 | Yoshimoto | 229/123.1 |
| 4,961,573 | 10/1990 | Gossedge et al. | 220/359 |
| 5,002,223 | 3/1991 | Bolte et al. | 229/125.35 |

FOREIGN PATENT DOCUMENTS 2233380 9/1990 Japan ............................ 229/125.35

OTHER PUBLICATIONS

Japanese Industrial Standard: Testing Methods for Peel Strength of Adhesives, JIS K 6854-1977, Translated and Published by Japanese Standards Association.

Primary Examiner—Stephen Marcus
Assistant Examiner—Christopher McDonald
Attorney, Agent, or Firm—Browdy and Neimark

[57] ABSTRACT

The present invention provides an easily openable sealed container consisting of a lid and a main body having a flange, wherein a sealing layer of the main body or a sealing layer of the lid has a number of microdents in the flange portion, the thickness of said sealing layer is 10-1000 μ, said sealing layer and an adjacent layer contacting therewith have a lamination strength of 300-2,000 g/25 mm width, and said sealing layer and the lid or the main body are sealed in the flange portion at a strength larger than said lamination strength, as well as a process for producing said sealed container.

11 Claims, 13 Drawing Sheets

FIG. IIA
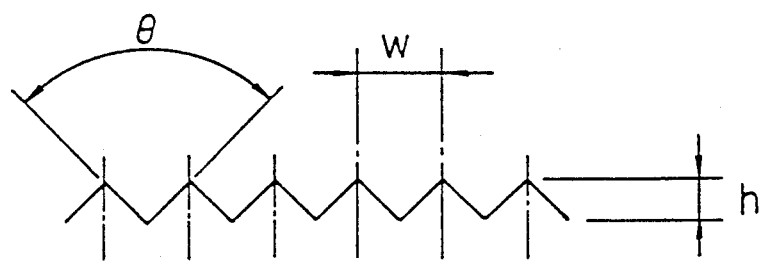
θ : ANGLE OF BITE (ANGLE OF MOUNTAIN)
W : PITCH
h : DEPTH (HIGHT OF MOUNTAIN)

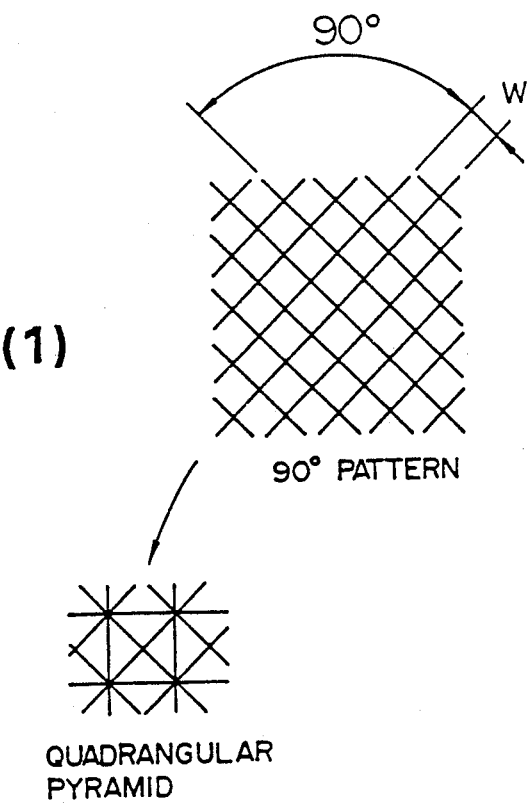
FIG. 11B (1)
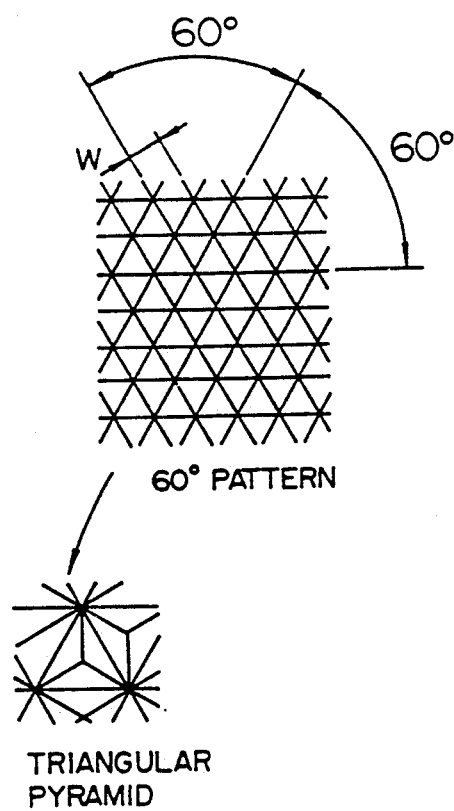
FIG. 11B (2)

FIG. 12 (1)  FIG. 12 (2)
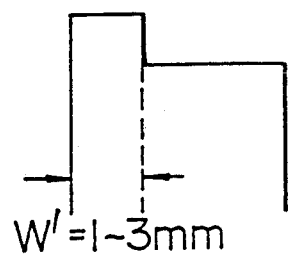
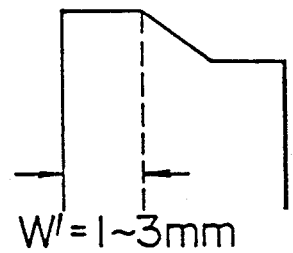
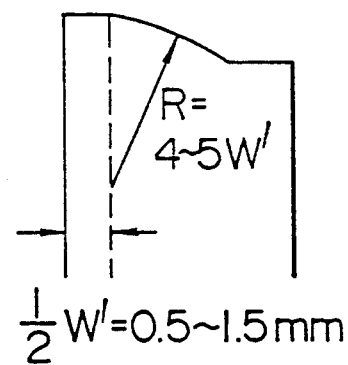
FIG. 12 (3)

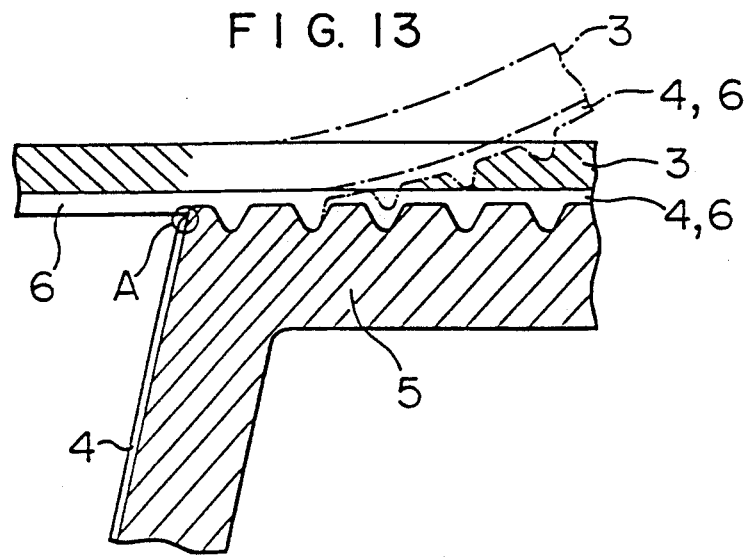
FIG. 13
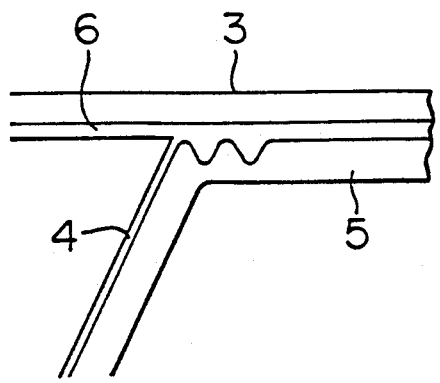
FIG. 14 (1)
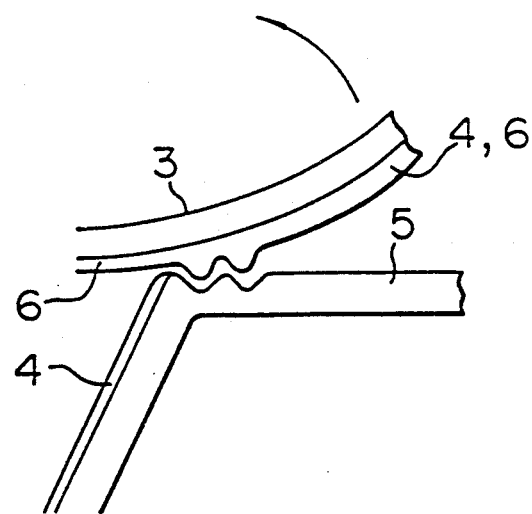
FIG. 14 (2)

FIG. 15 (1)
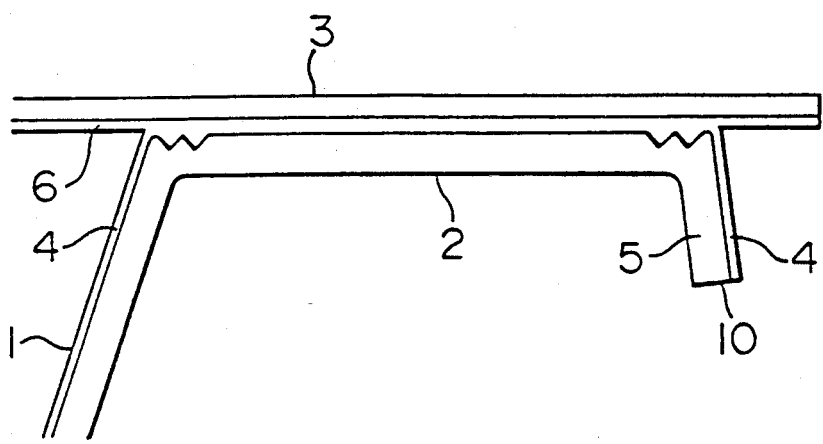
FIG. 15 (2)     FIG. 15 (3)
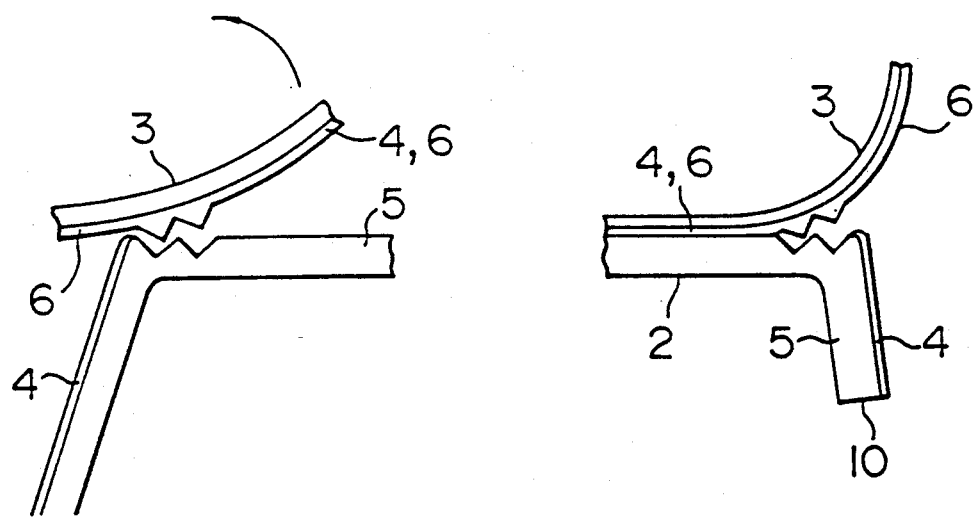

EASILY OPENABLE SEALED CONTAINER

BACKGROUND OF THE INVENTION

The present invention relates to a sealed container for food packaging, comprising a plastic main body having a flange portion and a lid, wherein the lid can be peeled easily, as well as to a process for producing the sealed container.

As a container for packaging various foods, there are in wide use sealed plastic containers of the so-called easy opening structure wherein the lid can be peeled easily.

THE PRIOR ART

The most commonly used conventional sealed containers of easy opening structure include those of interfacial peeling type wherein the sealing strength between the flange portion of the main body and the lid is controlled at an appropriate level (ordinarily 500-1,500 g/15 mm width) by appropriately selecting the composition of the resin constituting the sealing layer of the lid, to give rise to peeling at the sealing interface and enable the opening of the container, as disclosed in, for example, Japanese Utility Model Application Kokai Nos. 56-125870, 57-1154, 59-118766, 61-48162 and 63-31926.

In these sealed containers of interfacial peeling type, however, the sealing strength between the flange portion of the main body and the lid was liable to be affected by various factors such as sealing conditions, environmental temperature and adhesion of contents to the sealed portion, and was difficult to control in a desired range, which caused frequent fluctuation of the sealing strength. When the sealing strength was too small, there was sometimes caused leakage of contents due to poor sealing. When the sealing strength was too large, peelability of the sealed container was poor, impairing the easy openability. Since the leakage of contents is detrimental for sealed containers, the sealing strength was generally set at a higher level by employing, for example, a higher sealing temperature or pressure, even though the peelability was sacrificed somewhat.

In order to overcome the above problem, there are known sealed containers of interlaminar peeling type wherein the opening of the container is effected by allowing the sealing layer and the layer adjacent thereto, of the flange portion of the main body to cause delamination, or by allowing the sealing layer and the layer adjacent thereto, of the lid to cause delamination as disclosed in e.g., Japanese Patent Publication No. 50-37597.

However, when such a container was prepared using an ordinary sealing method, it was impossible to smoothly break the sealing layer and accordingly it was difficult to take out the contents.

In order to facilitate the breakage of the sealing layer, there are proposed, for example, improved sealed containers wherein the main body has grooves at the flange portion (e.g., Japanese Patent Application Kokai Nos. 62-251363, 63-78 and 63-25037) and improved sealed containers wherein the main body has a groove for initiating peeling and a groove for stopping peeling, at the flange portion (e.g., Japanese Patent Application Kokai Nos. 63-96060 and 63-96061). These sealed containers, however, had a risk of impairing the pressure resistance. Moreover, sealing had to be controlled carefully so that a heat-seal head was not applied to the groove portion(s). Even slight application of the heat-seal head to the groove portion(s) made it difficult to cut the sealing layer, making difficult in some cases the sharp separation of the lid from the main body; thus, there remained a problem in openability.

The sealed containers of interlaminar peeling type wherein the sealing layer and the layer adjacent thereto, of the lid are allowed to cause delamination, were derived from the technique (Japanese Patent Publication No. 50-37597) of allowing the flange of the main body to cause interlaminar peeling and are disclosed in, for example, Japanese Utility Model Application Kokai Nos. 56-138075, 57-164072 and 63-70963.

In these approaches, however, a heat-seal head had to be applied between the slits of the sealing layer by precise positioning, to exhibit the effect; first the lid had to be precisely set onto the flange portion of the main body and, moreover, the heat-seal head had to be applied as mentioned above; thus, heat sealing was very difficult to control.

Further, there is proposed a sealed container wherein a sealing material having the same shape as the flange of the main body is prepared by punching, the material is melt-bonded onto the flange, and then a lid is sealed thereon (Japanese Utility Model Application Kokai No. 63-28668). In this approach, however, there had to be employed an additional step of precisely setting the sealing layer on the flange and further melt-bonding it thereon; the positioning (registering) was very troublesome; thus, the productivity was low.

Besides, there is proposed a sealed container wherein the sealing layer of the lid has groove(s). In this approach, the positioning (registering) of the main body and the lid had to be controlled precisely, and moreover there were the same problems as in the containers having groove(s) at the flange.

A sealed container using a thick lid having a depression at the inner portion is convenient for preserving contents, because it has shape retainability and resealing after opening is substantially possible. However, when the lid had a thickness of 0.25 mm or more, it was difficult to seal the lid by a conventional means using heat and pressure; even if the sealing was possible, the opening of such a lid was not easy.

SUMMARY OF THE INVENTION

The object of the present invention resides in providing an easily openable sealed container which overcomes these problems and satisfies pressure-resistant sealing and easy opening (these have been contradictory requirements in the prior art) and yet requires no precise positioning (registering) at the time of sealing, as well as a process for producing such a sealed container.

According to the present invention, there are provided a sealed container for packaging which requires no special control at the time of sealing and has stable pressure resistance and smooth and easy openability as a result of sealing of a lid or a main body with the flange portion of the main body or the portion of the lid corresponding to the flange portion of the main body, said flange portion or lid portion having a number of microdents (1) on the whole surface area, (2) on the innermost circumferential surface ring shape having a width of 1-3 mm, or (3) on the innermost circumferential surface area and the outermost circumferential surface area both of ring shape having a width of 1–3 mm, as well as a process for producing the sealed container.

In other words, the present invention provides an easily openable sealed container consisting of a lid and a main body having a flange, wherein a sealing layer of the main body or a sealing layer of the lid has a number of microdents in the flange portion, the thickness of said sealing layer is 10–100μ, said sealing layer and an adjacent layer contacting therewith have a lamination strength of 300–2,000 g/25 mm width, and said sealing layer and the lid or the main body are sealed in the flange portion at a strength larger than said lamination strength, as well as a process for producing said sealed container.

According to one embodiment of the present invention, there is provided an easily openable sealed container, wherein the main body consists of a multi-layer sheet comprising a sealing layer and an adjacent layer contacting therewith, the lamination strength between the sealing layer and the adjacent layer contacting therewith is 300–2,000 g/25 mm width, said sealing layer has a thickness of 10–100μ, said sealing layer has a number of microdents in the flange portion on the whole surface or on the ring-shaped part(s) of the surface, said sealing layer is sealed with the lid in the flange portion at a strength larger than said lamination strength.

The preferred embodiments of the above container are as follows:

(1) Said container wherein the microdents are formed in a number of dots which have a depth d relative to the thickness t of the sealing layer of the main body, of d = 1t to 10t and which are arranged at pitch intervals of 0.3 mm to 0.8 mm, on the surface of the flange portion of the main body, in a ring shape of 1–3 mm width ranging from the innermost circumference of said surface to its outer circumference apart by said width.

(2) Said container wherein the microdents are formed in a number of dots which have a depth d relative to the thickness t of the sealing layer of the main body, of d = 1t to 10t and which are arranged at pitch intervals of 0.3 mm to 0.8 mm, on the surface of the flange portion of the main body, in two ring shapes, one ring having a 1–3 mm width and ranging from the innermost circumference of said surface to its outer circumference apart by said width and the other ring having a 1–3 mm width and ranging from the outermost circumference of said surface to its inner circumference apart by said width.

(3) Said container wherein the lid is a film-like lid or a lid having a depression at the inner portion.

(4) Said container wherein the section of the flange portion has an inverted reverse L shape.

According to another embodiment of the present invention, there is provided an easily openable sealed container wherein the lid consists of a multi-layer sheet of at least two layers comprising a sealing layer and an adjacent layer contacting therewith, the lamination strength between the sealing layer and the adjacent layer contacting therewith is 300–2,000 g/25 mm width, the sealing layer has a thickness of 10–100μ, the portion(s) of the lid corresponding to the whole or part(s) of the flange portion of the main body has (have) a number of microdents, and the whole surface of the flange portion of the main body and the corresponding portion of the lid are heat-sealed, after the main body has been filled with contents, at a strength larger than said lamination strength.

The preferred embodiments of the above containers are as follows:

(1) Said container wherein the lid is a film-like mutilayer sheet which has a transparent or opaque smooth surface.

(2) Said container wherein the lid is a transparent or opaque multi-layer sheet the section of which has an inverted T or U shape.

(3) Said container wherein the microdents are formed on the surface portion of the sealing layer of the lid corresponding to the whole flange portion of the main body.

(4) Said container wherein the microdents are formed on the surface portion of the sealing layer of the lid corresponding to the innermost portion of the flange of the main body, in a ring shape.

(5) Said container wherein the microdents are formed on the surface portions of the sealing layer of the lid corresponding to the innermost and outermost portions of the flange of the main body, in two ring shapes.

According to still another embodiment of the present invention, there is provided a process for producing an easily openable sealed container, which comprises (1) applying a bearer to a container main body having a flange, at the innermost circumferential portion of the backside of the flange portion, wherein the main body consists of a multi-layer sheet comprising a sealing layer and an adjacent layer contacting therewith, the lamination strength between the sealing layer and the adjacent layer is 300–2,000 g/25 mm width and the sealing layer has a thickness of 10–100μ, (2) applying an ultrasonic treatment to the flange portion from the surface layer side, i.e., sealing layer side by using an ultrasonic phone having a head provided with microprojections in dots having pitch intervals of 0.3–0.8 mm, to form microdents on the surface of the flange portion of the main body, and (3) heat-sealing the whole surface of the flange portion with a lid so that the sealing strength between the sealing layer of the flange portion of the main body and the lid becomes larger than the lamination strength between the sealing layer and the adjacent layer of the main body.

The preferred embodiments of the above process are as follows:

(1) Said process wherein the bearer has a flat smooth surface having a ring shape of 1–3 mm in width and the ultrasonic treatment is applied to the flange surface under such conditions as to form thereon microdents having a depth d relative to the thickness t of the sealing layer, of d = 1t to 10t, and relative to the total thickness T of the flange portion, of d < 1/5T.

(2) Said process comprising (1) applying a bearer having two flat smooth surfaces each of ring shape of 1–3 mm in width, to a main body having a flange of an inverted reverse L shape, at the innermost circumferential portion and also the circumferential portion closest to the flap portion, of the backside of the flange, and (2) applying an ultrasonic treatment to the flange surface under such conditions as to form microdents in a number of dots which have a depth d relative to the thickness t of the sealing layer, of d = 1t to 10t, and relative to the total thickness T of the flange portion, of d < 1/5T, in two ring shapes, at the innnermost circumferential portion and the circumferential portion closest to the flap portion, of the flange surface.

(3) Said process wherein the lid is a film-like lid or a lid having a depression at the inner portion.

According to still another embodiment of the present invention, there is provided a process for producing an easily openable sealed container, which comprises (1) applying a bearer to a container main body having a flange, at the innermost circumferential portion of the backside of the flange portion, wherein the main body consists of a multi-layer sheet comprising a sealing layer and an adjacent layer contacting therewith, the lamination strength between the sealing layer and the adjacent layer is 300–2,000 g/25 mm width and the sealing layer has a thickness of 10–100μ, (2) placing on the flange portion a lid of 0.25 mm or more in thickness, having a depression at the inner portion, and (3) applying an ultrasonic treatment to the flange portion from the flange surface side, i.e., sealing layer side by using an ultrasonic phone having a head provided with microprojections in a number of dots having pitch intervals of 0.3–0.8 mm, to form microdents and simultaneously seal the lid with the flange.

BRIEF DESCRIPTION OF THE FIGURES

FIG. 11A is an enlarged sectional view of an ultrasonic phone head and FIG. 11B (1,2) are enlarged plan views of the head.

FIG. 12 (1-3) show examples of a bearer for an ultrasonic phone.

FIGS. 13, 14 (1,2) and 15 (1-3) are each enlarged sectional view(s) showing sealed and opened states of a lid at the flange portion.

DETAILED DESCRIPTION OF THE INVENTION

The numerals used in the figures refer to the followings. 1: container main body, 2: flange portion of main body, 3: lid, 4: sealing layer of main body, 5: adjacent layer contacting with sealing layer, of main body, 6: sealing layer of lid, 7: microdents, 8: ultrasonic phone, 9: bearer, 10: flap, 11: lid having a depression at the inner portion, 21 & 21': lid, 22: container main body, 23: flange portion of main body, 24: microdents, 25: sealing layer of lid, 26: adjacent layer contacting with sealing layer, of lid.

Figure 1:
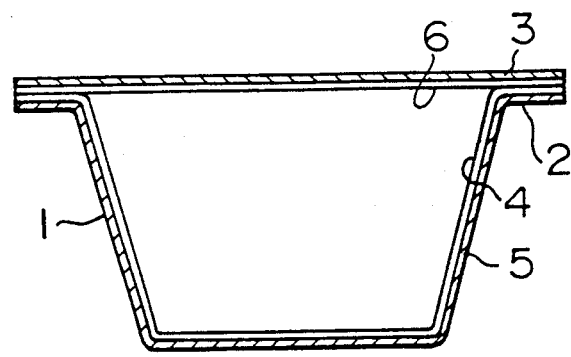
FIG. 1 is a sectional view of an easily openable sealed container of the present invention.
Figure 6:
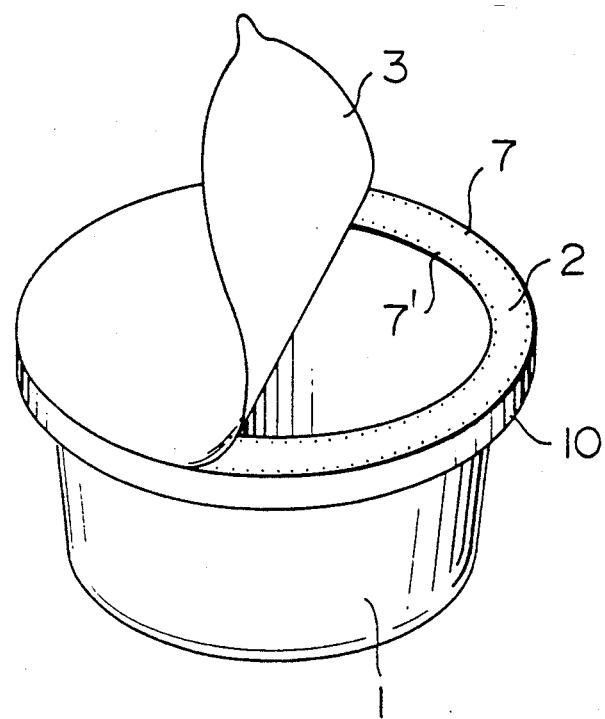
Figure 7:
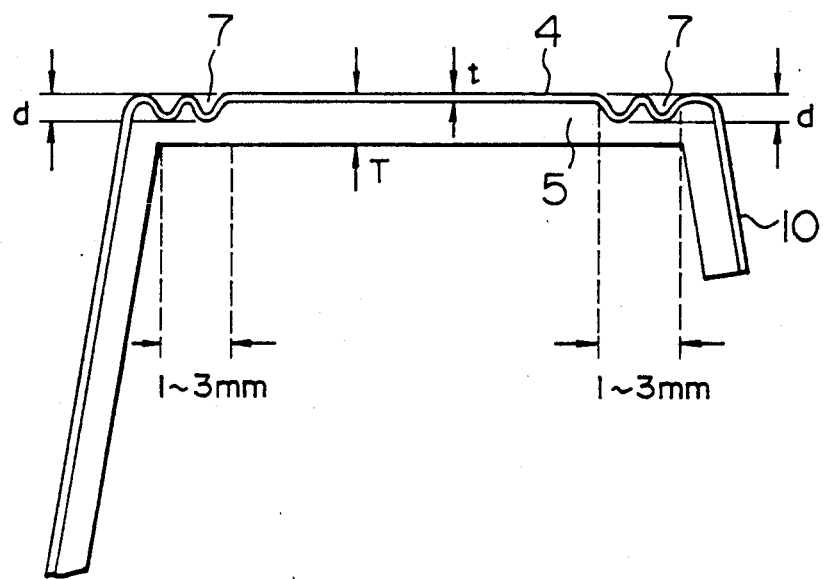
Figure 16:
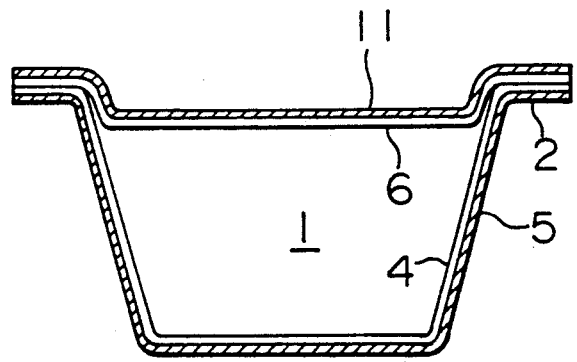
FIG. 16 is a sectional view of a sealed container of the present invention using a lid having a depression at the inner portion.

Hereinafter described with reference to the accompanying drawings. FIG. 1 is a sectional view showing an easily openable sealed container of the present invention. In FIG. 1, 1 is a container main body having a flange portion 2, and 3 is a lid sealed with the flange portion 2. The main body 1 consists of a multi-layer sheet comprising a selaing layer 4 and an ajdacent layer 5 contacting therewith. As the main body, there may also be used a main body having a flap 10 at the outermost circumferential portion of the flange, as shown in FIG. 6 and FIG. 7. As the lid, there may also be used a lid 11 having a depression at the inner portion as shown in FIG. 16.

The multi-layer sheet may be a two-layer sheet consisting of a sealing layer 4 of, for example, polyethylene resin and an adjacent layer 5 of, for example, polypropylene resin, or may be a multi-layer sheet consisting of said sealing sheet 4, said adjacent sheet 5, an adhesive layer placed on the adjacent layer, a barrier layer formed on the adhesive layer, made of a saponification product of an ethylene-vinyl acetate copolymer, a vinylidene chloride resin or the like, an adhesive layer placed on the barrier layer, and an outermost layer formed on the adhesive layer, made of a polypropylene resin, a polyester resin or the like. Optionally, the multi-layer sheet may comprise an outermost or intermediate layer made of a metal, a paper, a ceramic or the like.

In the multi-layer sheet constituting the main body 1, it is required that the lamination strength between the sealing layer 4 and the adjacent layer 5 be 300–2,000 g/25 mm width (peeling angle=180°, peeling rate=200 mm/min) and that the sealing layer 4 have a thickness of 10–100μ, preferably 10–70μ.

This is because no sufficient sealing is assured when the lamination strength is less than 300 g/25 mm width and the thickness of the sealing layer is less than 10μ, and because peeling resistance at the time of opening is large and moreover smooth peeling is difficult when the lamiantion strength is more than 2,000 g/25 mm width and the thickness of the sealing layer is more than 100μ.

The film constituting the lid 3 is desired to have a sealing layer 6 made of a material enabling strong adhesion to the sealing layer 4 of the main body. In the most preferred embodiment, the sealing layer 6 of the lid is made of the same resin material as that used in the sealing layer 4 of the main body.

The film of the lid 3 may be a single layer or a multilayer sheet comprising a metal foil or a plastic layer both of good barrier property.

Figure 2:
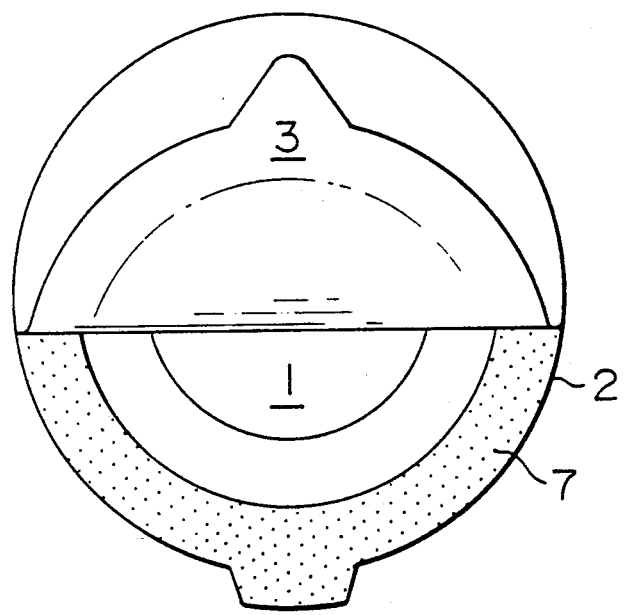
FIGS. 2, 4 and 6 are each a plan view or perspective view of a container in a state where the lid is half opened.
Figure 3:
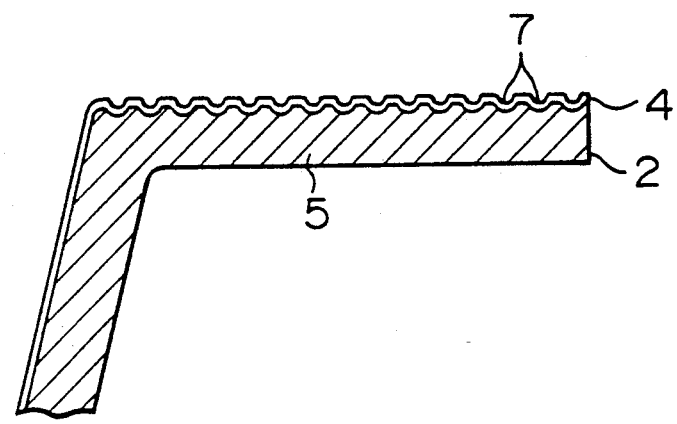
FIGS. 3, 5 and 7 are each an enlarged sectional view of the flange portion of a container main body, on which flange portion microdents have been formed by, for example, an ultrasonic treatment.

In the container shown in FIG. 2 and FIG. 3, a number of microdents 7 are formed on the whole surface of the sealing layer of the main body 1 at the flange portion 2.

Figure 8:
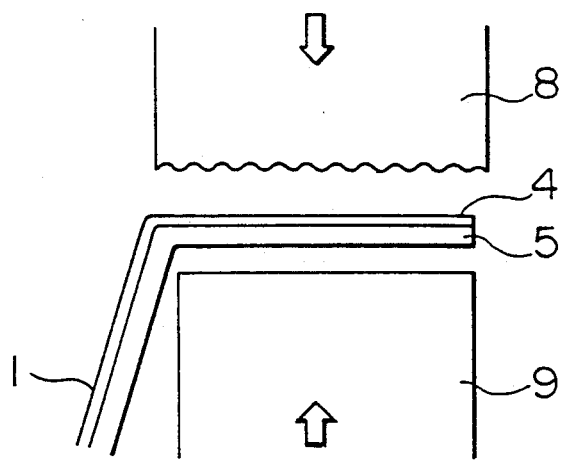
FIGS. 8, 9 and 10 are each a schematic view showing a step of forming microdents on the flange portion.

Formation of the microdents 7 can be effected by, for example, application of ultrasonic wave, hot or cold pressing, or utilization of high frequency. In order to form microdents uniformly and precisely on the whole surface of the flange portion, it is preferable to apply an ultrasonic treatment with an ultrasonic phone having a head provided with a number of microprojections. As shwon in FIG. 8, a main body 1 is placed on a bearer for supporting the flange portion 2 of the main body, and then a pressure is applied to the flange portion 2 by an ultrasonic phone 8 to effect an ultrasonic treatment and form a number of mcirodents 7 as shown in FIG. 2 and FIG. 3. In this case, the number of the microdents 7 formed is preferably 50-1,000 per $cm^2$. When the number is less than 50 per $cm^2$, improvement in openability is low. When the number is more than 1,000 per $cm^2$, the operation of forming microdents is difficult.

Sealing is effected by contacting the sealing layer 6 of a lid 3 with the flange portion 2 of a main body 1, said flange portion having a number of microdents 7 on the sealing layer, and then sealing the lid with the flange portion. In this case, it is necessary that the sealing strength between the sealing layer 4 of the flange portion and the sealing layer 6 of the lid be larger than the lamination strength between the sealing layer 4 and the adjacent layer 5 of the main body. Sealing can be effected by a typical means such as heat sealing, ultrasonic sealing, high frequency sealing or the like.

Figure 4:
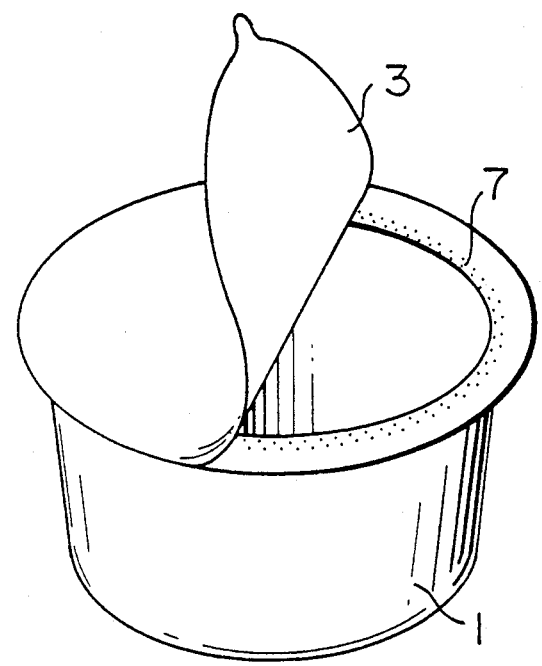
Figure 5:
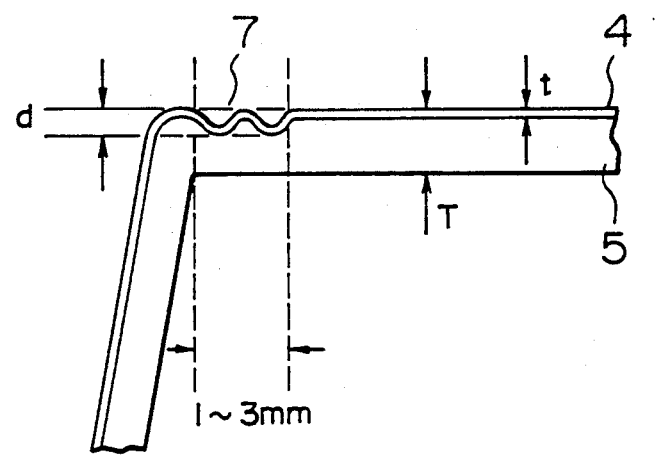
Figure 9:
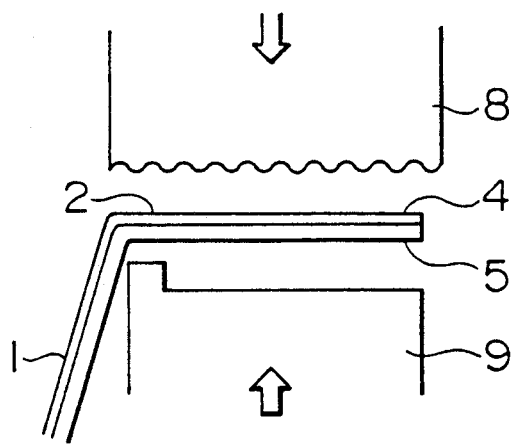

In the container shown in FIG. 4 and FIG. 5, a number of microdents 7 are formed on the innermost circumferential surface area of the sealing layer of the flange portion 2 of the main body 1, in a ring shape of 1-3 mm in width. FIG. 5 is an enlarged view of a flange portion having microdents thereon, and FIGS. 11A and 11B are respectively an enlarged sectional view and an enlarged plan view of an ultrasonic phone head. FIG. 12 shows sectional views of various bearers. As shown in FIG. 4 (a perspective view of a container), microdents 7 are formed on the innermost circumferential surface area of the flange portion. As shown in FIG. 9, a bearer 9 having a flat smooth surface of 1-3 mm in width as shown in FIG. 12 is applied to the back side of the flange portion 2 of a main body 1; to the sealing layer of the flange portion is applied an ultrasonic phone 8 as shown in FIG. 11, having a head provided with microprojections of quadrangular or triangular pyramid shape in dots having pitch intervals w of 0.3-0.8 mm; thereby, a number of microdents are formed in dots on the surface of the flange 2, which microdents have a depth d relative to the thickness t of the sealing layer, of $d = 1t$ to $10t$. Incidentally, the depth d of the microdents satisfies $d < 1/5T$ relative to the total thickness T of the flange.

In the container shown in FIG. 6 and FIG. 7, a number of microdots 7 are formed on the innermost circumferential surface area and the outermost circumferential surface area of the sealing layer of the flange portion 2 of a main body 1 having an inverted reverse L shape, in two ring shapes each of 1-3 mm in width. FIG. 7 is an enlarged view of a flange portion having microdents.

Figure 10:
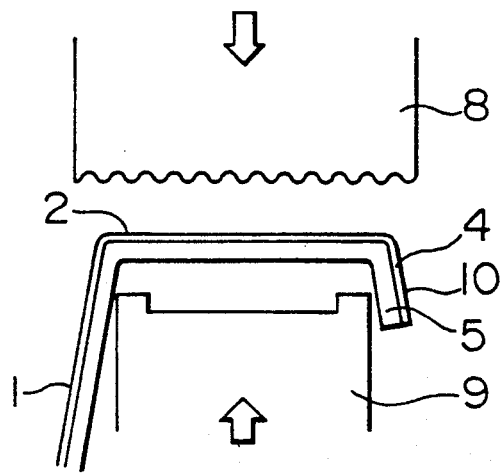

As shown in FIG. 6 (a perspective view of a container), microdents 7 are formed on the innermost circumferential surface area and the outermost circumferential surface area of the flange portion of the main body. As shown in FIG. 10, a bearer 9 having, at the innermost and outermost portions, two ring shape projections each having a smooth flat surface of 1-3 mm in width is applied to the backside of the flange portion 2 of a main body 1; to the sealing layer of the flange portion is applied an ultrasonic phone 8 having a head provided with microprojections in dots having pitch intervals of 0.3-0.8 mm; thereby, a number of microdents are formed in dots on the surface of the flange 2, which microdents have a depth d relative to the thickness t of the sealing layer, of $d = 1t$ to $10t$. Incidentally, the head of the ultrasonic phone 8 can have a front shape as shown in FIG. 11, and each of the projections (having a smooth flat surface) of the bearer 9 can have a sectional shape as shown in FIG. 12 (1-3).

Figure 17:
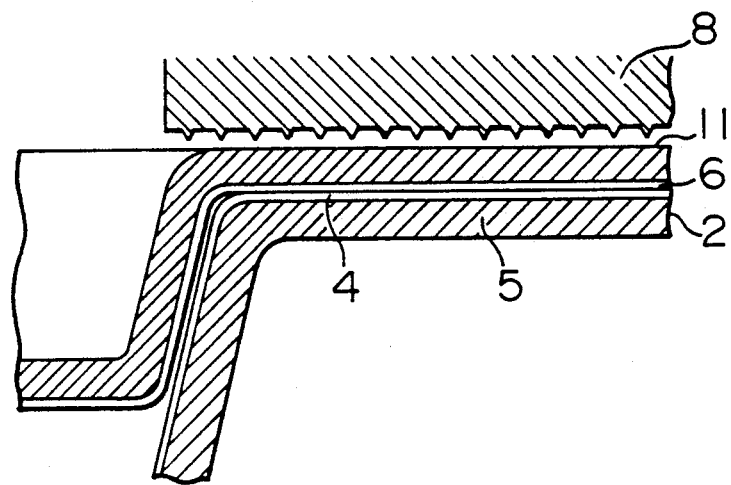
FIG. 17 is a sectional view showing a method for sealing a lid having a depression at the inner portion.
Figure 18:
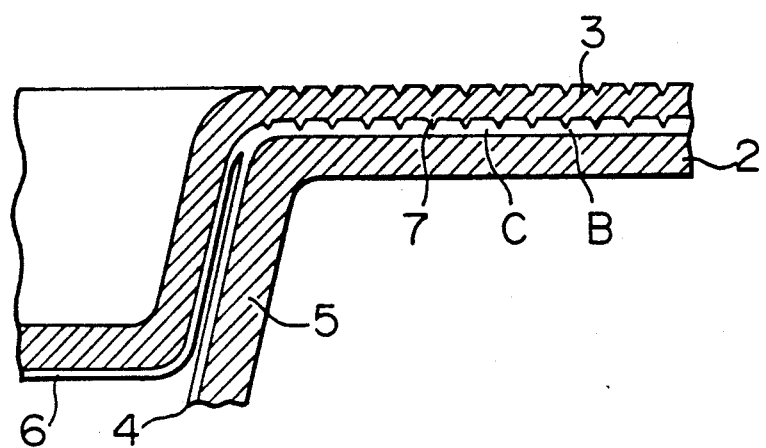
FIG. 18 is a sectional view showing a state where a lid having a depression at the inner portion has been sealed by ultrasonic sealing.

When there is used a lid 11 having a depression at the inner portion, as shown in FIG. 16, the lid 11 is contacted with the flange portion 2 of a main body 1 having a smooth sealing layer 4, as shown in FIG. 17, and an ultrasonic phone 8 having a number of microprojections is applied from the lid 11 side to effect ultrasonic sealing. The flange portion of the container formed by this sealing has a section as shown in FIG. 18. In this section, there are seen, in the laminated layer, portions B which correspond to the microprojections of the head of the ultrasonic phone 8 and which, as compared with other portions C, are weakened due to concentrated stress. These portions of concentrated stress exist in a large number in the lamiated layer, which allows the laminated layer to have a uniform distribution of strong and weak portions and serves to reduce the peeling resistance in opening the container.

In the easily openable sealed container of the present invention produced according to the above manner, there are formed microdents having a depth d relative to the total thickness T of the flange portion, of $d < 1/5T$. The pitch intervals w of the microdents are required to be 0.3-0.8 mm. When the intervals are less than 0.3 mm, the number of the microdents is too large, making it difficult to obtain an effective depth d; this makes it impossible to obtain stable peeling and further gives poor appearance after peeling. When the intervals are more than 0.8 mm, the number of the microdents is too small, no smooth peeling is secured, and the appearance after peeling is poor (generation of stringing).

When the microdents are formed not on the whole surface of the flange but on the part of its surface, the microdents formed by ultrasonic treatment are required to form a ring shape having a width w' of 1-3 mm. When the width is less than 1 mm, the bearer intrudes into the backside of the flange at the time of ultrasonic treatment, which may give poor apeparance to the flange and may further cause the breakage of the flange during the distribution of the container. Moreover, easy openability varies depending upon the relation with pitch intervals w. When the width w' is more than 3 mm, the contents which have been fed in an excessive amount at the time of filling, may come into the microdents to be formed after the filling and, as a result, may cause insufficient adhesion and poor appearance.

Further, the depth d of the microdents formed by ultrasonic treatment has correlations with the thickness of the sealing layer and the pitch intervals. In the above case, the depth d is required to satisfy d=1t to 10t relative to the thickness t of the sealing layer. When d is less than 1t, easy openability is impaired and the appearance after peeling is poor. When d is more than 10t, peelability is impaired greatly and the container appearance after sealing is poor. Furthermore, d preferably satisfies d<1/5T relative to the total thickness T of the flange, because a depth d of larger than 1/5T reduces the strength of the flange or brings about a state where microdents reach near the backside of the flange.

The microdents are required to have such a size that the resin constituting the sealing layer of the lid can completely fill the microdents at the time of heat sealing.

Desirably, the microdents are formed at pitch intervals w of 0.4–0.6 mm (diagonal pitch intervals=0.6–0.9 mm) at a depth d of 2t to 5t at a width (of the part where the microdents are formed) of 1–2 mm, because it gives smooth peeling.

In the present invention, sealing is effected, for example, by contacting the flange portion 2 of a main body having microdents on the innermost circumferential surface area of 1–3 mm in width, of the sealing layer of the flange portion, with the sealing layer 6 of a lid 3 and then effecting heat sealing. In this case, it is necessary that the sealing strength between the sealing layer of the flange and the sealing layer of the lid be larger than the lamination strength between the sealing layer 4 and the adjacent layer 5 of the main body.

Figure 20:
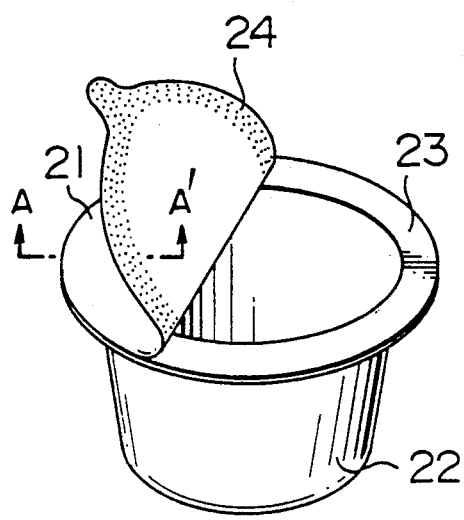
FIG. 20 is a perspective view showing the half-opened state of a container obtained by forming a number of microdents on the portion of a film-like lid corresponding to the flange of a main body and then heat-sealing the resulting lid with the main body.
Figure 21:
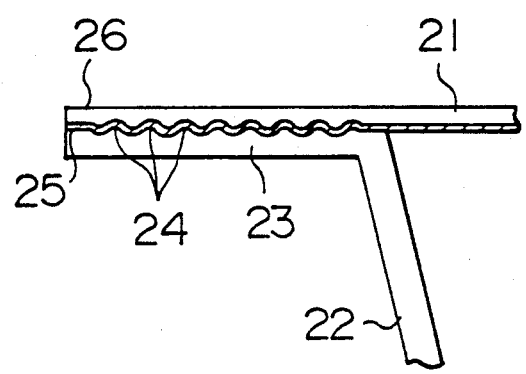
FIG. 21 is a sectional view taken at the line A—A' of FIG. 20.

In the container shown in FIG. 20 and FIG. 21, it is necessary that a number of microdents 24 be formed on the portion of the lid 21 corresponding to the flange portion 23 of the main body 22. These microdents 24 can be formed by using an ultrasonic phone having a head provided with a number of microprojections.

Figure 24:
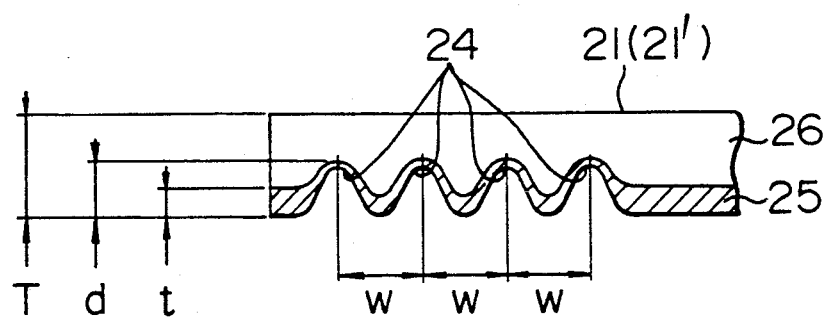
FIG. 24 is an enlarged sectional view of the portion of a lid wherein microdents have been formed on the sealing layer.

These microdents 24 are formed, as shown in FIG. 24, in a number of dots on the sealing layer of the lid at the outer circumference at pitch intervals w of 0.3–0.8 mm at a depth d of d=1t to 10t relative to the thickness t of the sealing layer of the lid and of d<1/5T relative to the total thickness T of the lid.

Figure 22:
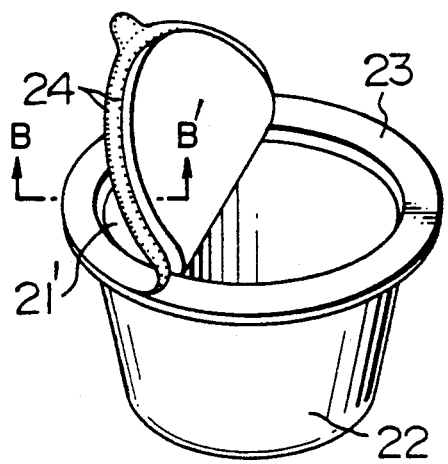
FIG. 22 is a perspective view showing the half-opened state of a container obtained by forming microdents on the flange portion of a lid having a depression at the inner portion at the innermost circumferential area and the outermost circumferential area in two ring shapes and then sealing the resulting lid with a main body.
Figure 23:
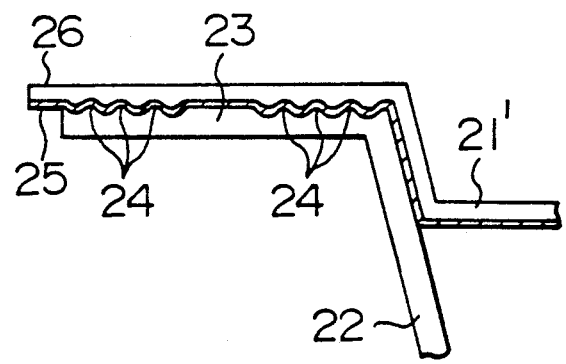
FIG. 23 is a sectional view taken at the line B—B' of FIG. 22.

In the present invention, the microdents 24 may be formed on the whole surface of the sealing layer 25 of the lid 21. However, it is preferable that the microdents 24 be formed on the portion of the lid 21 corresponding to the flange portion 23 of the main body 22, as shown in FIG. 20 and FIG. 21. It is also desirable that the microdents 24 be formed on the portion(s) having a width of 1–3 mm, of the lid 21 corresponding to the innermost circumferential portion or the innermost and outermost circumferential portions of the flange 23 of the main body 22, as shown in FIG. 22 and FIG. 23.

In registering of the lid 21 having microdents and the flange portion 23 of the main body 22 at the time of heat sealing, flat sealing can be employed when the microdents 24 are formed on the whole surface of the sealing layer of the lid. When the microdents 24 are formed only on the portion of the lid 21 corresponding to the flange portion 23 of the main container 22, the microdents are formed in an area slightly larger than the area of the flange, whereby slight registering error can be absorbed. When registering is made so that the lid can correspond to the innermost portion or the innermost and outermost portions of the flange, the microdents are formed on the lid at the portions corresponding to said portions of the flange, in widths slightly larger than those of said flange portions, whereby the registering do not require high precision. Also, heat sealing of the main body and the lid can be effected very easily and, even when heat sealing is conducted with the heat seal head contacted with the microdents, neither peelability nor sealability are affected.

In a preferred embodiment of the present container, the lid is a transparent or opaque film-like multi-layer lid having a flat smooth surface, or a transparent or opaque multi-layer lid formed in an inverted T or U shape, and the microdents are formed on the sealing layer of the lid at the portion corresponding to the whole flange portion of the main body, or at the portion corresponding to the innermost circumferential portion of the flange of the main body, or at the portions corresponding to the innermost and outermost circumferential portions of the flange of the main body.

The feature of the above container lies in its lid, and the lid has microdents at the portion corresponding to the flange portion of the main body. The main body is filled with contents and then heat-sealed with the lid, whereby an easily openable sealed container is obtained.

The lid may be a two-layer sheet consisting of, for example, a sealing layer 25 made of a polyethylene resin and an adjacent layer 26 made of a polypropylene resin. Alternatively, the adjacent layer may be a multi-layer consisting of a barrier layer made of a saponification product of an ethylene-vinyl acetate copolymer, a vinylidene chloride resin or the like, a layer made of a polyamide resin, a polyester resin or the like, and a layer of a metal, a paper or the like.

In such a lid 21, it is necessary that the lamination strength between the sealing layer 25 and the adjacent layer 26 be 300–2,000 g/25 mm width (peeling angle=180°, peeling rate=200 mm/min) and the sealing layer has a thickness of 10–100µ, preferably 10–70µ. This is because when the lamination strength is less than 300 g/25 mm width and the thickness of the sealing layer is less than 10µ, no sufficient sealability is ensured and, when the lamination strength is more than 2,000 g/25 mm width and the thickness of the sealing layer is more than 100µ, the peeling resistance in opening the sealed container is large, impairing smooth and easy peeling.

The lid may have a flat film shape as shown in FIG. 20, or may be a molded article such as a lid 21' having a depression at the inner portion, as shown in FIG. 22 and FIG. 23. In such a molded article, the flange portion of the main body and the heat-sealing portion of the lid corresponding to the flange are fixed, whereby registering for formation of microdents on the lid becomes easy and position for heat sealing is fixed.

When the process of the present invention for producing an easily openable sealed container is applied to a forming-filling-sealing machine or to a filling-sealing machine using a preformed main body, a production apparatus used in the present invention can be installed at the step conducted prior to or after the apparatus for filling contents.

In the above sealed structure according to the present invention, the sealing layer 6 of the lid 3 and the sealing layer 4 of the flange portion 2 are strongly bonded to form an integrated sealing layer, as shown in FIG. 13, FIG. 14 (1,2) and FIG. 15 (1–3). The resin of the integrated sealing layer fills the microdents 7 formed in dots on the innermost circumferential portion of the flange. Accordingly, in the integrated sealing layer, the levels of the thickness and sealing strength vary continuously within a certain range of the layer. This unique sealed structure provides stable resistance to internal and external pressures at the time of sealing and enables smooth interlaminar peeling at the time of opening.

In opening of the sealed container as shown in FIG. 13 in which the microdents are formed on the whole surface of the flange, interlaminar peeling starts at the interface between the adjacent layer 5 of the flange and the integrated sealing layer 4 and 6 when the lid 3 is pulled upward, as shown by the dotted line. In this case, the continuous variation in the levels of the thickness and sealing strength of the integrated sealing layer alleviates peeling resistance effectively, whereby smooth opening is realized. The ultimate and complete opening is achieved by breaking the innermost thin portion A of the sealing layer of the flange.

In opening of the sealed container as shown in FIG. 14 (1,2) in which the microdents are formed on the innermost circumferential portion of the flange, interlaminar peeling takes place first and complete opening is achieved by easily breaking the sealing layer at the portion where the microdents are formed.

In opening of the sealed container as shown in FIG. 15 (1-3) in which the microdents are formed in two ring shapes at the innermost and outermost circumferential portions of the flange, the breakage of the sealing layer 4 takes place first by a small force at the outermost circumferential microdent portion of the flange, then interlaminar peeling occurs, and smooth and complete opening is achieved by easily breaking the innermost circumferential microdent portion of the sealing layer 4 of the flange.

Figure 19:
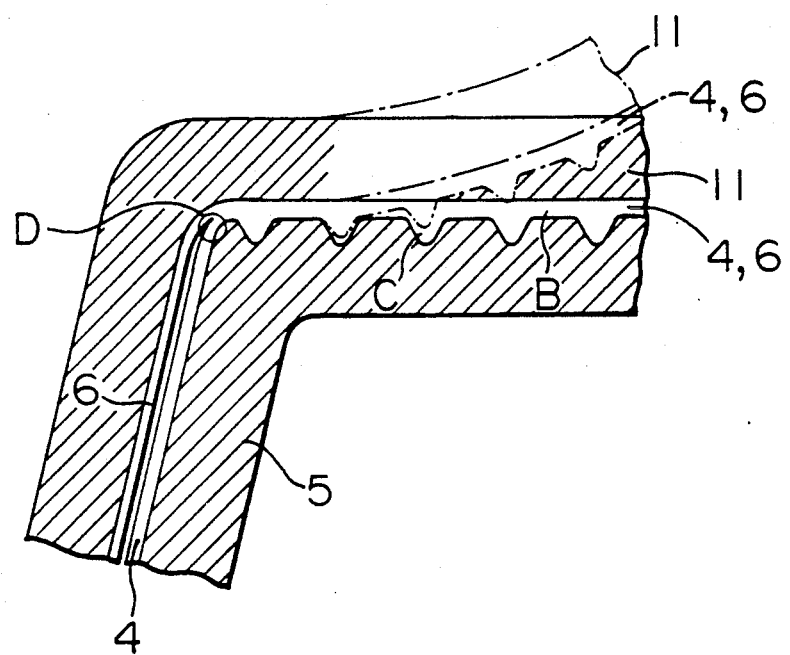
FIG. 19 is a sectional view showing the sealed and opened states of a lid having a depression at the inner portion.

Strong sealing is possible even in the case of a lid having a depression at the inner portion and having a thickness of 0.25 mm or more, by employing an ultrasonic treatment. Sealing by an ultrasonic phone having a number of microprojections gives a sealed structure (integrated sealing layer) in which portions of concentrated stress exist in a number of continuous dots; the resulting unique variation of the sealing layer in sealing strength alleviates the peeling resistance effectively to enable reliable and smooth interlaminar peeling and opening. In opening of, for example, the sealed structure of FIG. 19, by pulling upward the end of the lid 11 having a depression at the inner portion, peelig starts at the interface between the adjacent layer 5 of the flange and the integrated sealing layer 4 and 6, as shown by the dotted line of FIG. 19; peeling proceeds smoothly owing to the continuous variation of the sealing layer in peeling strength (B is a highly stressed portion of lower peeling strength and C is a less stressed portion of higher peeling strength) in spite of the large thickness of the lid 11; ultimate and complete opening is achieved by breaking the thin portion D of the sealing layer located at the innermost portion of the flange. Sealing by a thick lid having a depression at the inner portion, of high shape retainability has been impossible according to the conventional heat-sealing technique, but it has become possible now. This enables a pressure-resistant sealed container using a lid which can be easily undone and put on again.

Figure 25:
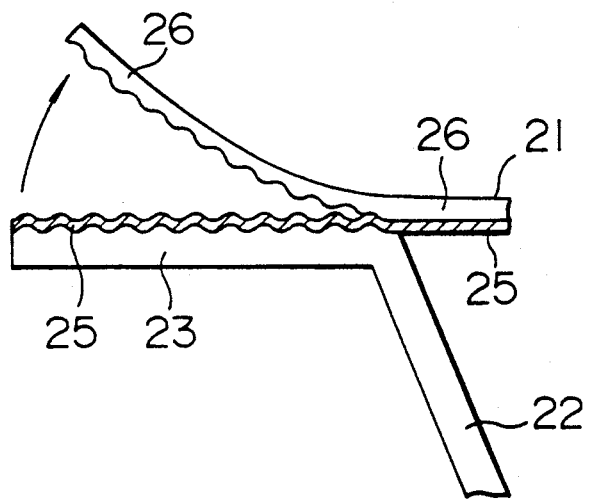
FIG. 25 is a view showing the opened state of a container having a film-like lid having microdents on the portion corresponding to the flange of a main body.
Figure 26:
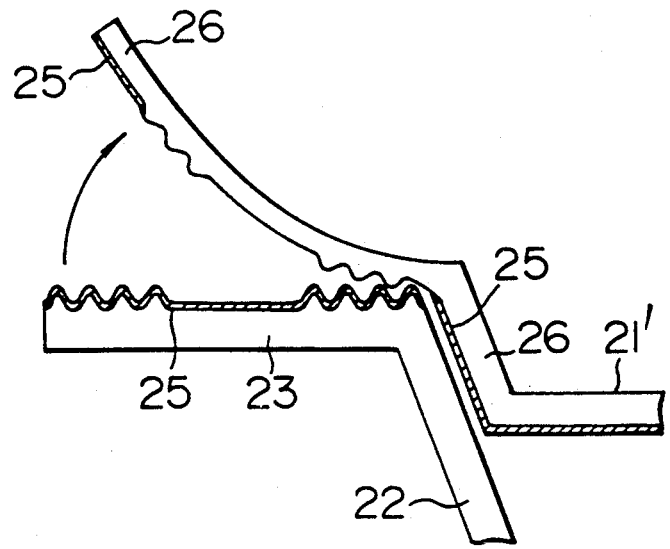
FIG. 26 is a view showing the opened state of a container having a lid having a depression at the inner portion, in which container a number of microdents have been formed on the flange of the lid at the innermost and outermost portions in two ring shapes.

In another sealed structure of the present invention, the sealing layer of a lid and the flange portion of a main body are bonded strongly to form an integrated structure, wherein the microdents formed on the sealing layer of the lid are filled with the surface resin of the flange of the main body. Owing to this sealed structure, stable resistance to internal and external pressures are secured at the time of sealing and, at the time of opening, smooth interlaminar peeling is caused, then peeling proceeeds to the innermost portion of the flange of the main body, and thereafter the sealing layer is easily broken at the innermost microdent portion as shown in FIG. 25 and FIG. 26 to complete opening.

The sealed container of the present invention obtained by heat-sealing a lid with the sealing layer of the flange portion of a main body, which sealing layer has microdents formed in dots by, for example, an ultrasonic treatment, or by heat-sealing the flange portion of a main body with the sealing layer of a lid, which sealing layer has microdents, has stable sealing and enables smooth easy peeling. The process of the present invention for producing a sealed container employs very easy heat sealing as compared with the conventional processes, requires no precise registering, and can efficiently produce a sealed container having stable peelability and pressure resistance.

EXAMPLE 1

There was prepared, by co-extrusion, a two-layer sheet of $850\mu$ in total thickness consisting of (a) a sealing layer made of a high density polyethylene (HDPE) having a density of 0.955 and a melt index (MI) of 5 g/10 min and (b) an adjacent layer, which serves also as an outer layer, made of a polypropylene (PP) having a melt index of 0.5 g/min. The sheet was subjected to vacuum molding to obtain a container main body having an inside diameter of 65 mm, an outside diameter of the flange portion of 75 mm and a height of 25 mm. In the container main body, the thickness of the sealing layer was $20\mu$ and the lamination strength between the sealing layer and the adjacent layer was 1,500 g/25 mm width.

Then, the sealing layer of the flange portion of the main body was subjected to an ultrasonic treatment by using an ultrasonic phone provided with a head having a number of microprojections (pitch intervals of microprojections: 0.6 mm, number of microprojections: $256/cm^2$), to form a number of microdents on the whole surface of the flange.

The ultrasonic treatment was effected under the conditions of an output of 2 kw (energy used: 225 j), a pressure of 338 kpa and a period of time of 0.3 sec, to form microdents having a depth of $120\mu$ in dots.

There was used a lid obtained by dry-laminating an oriented polyamide film (thickness: $30\mu$) to a high density polyethylene film as a sealing layer (the same material as used for the sealing layer of the main body) (thickness: $50\mu$).

The sealing layer of the lid was contacted with the sealing layer of the flange portion of the main body, and heat sealing was effected two times under the conditions of a surface pressure of 2 $kg/cm^2$, a temperature of 190° C. and a period of time of 1 sec to obtain an easily openable sealed container of the present invention.

For each of 50 sealed containers obtained as mentioned above, the lid was undone. In all the containers, peeling had no feeling of resistance, opening was stable and smooth, and the opened surfaces had no fluffing and no deformation.

The sealed containers were also measured for puncture pressure when a tacky rubber sheet (thickness: 1.5 mm) was adhered to the center of the lid of each container, a needle was inserted into the container therethrough, and air was fed under pressure into the container at a rate of 2 cc/sec.

The results of the openability and the puncture pressure are shown in Table 1.

COMPARATIVE EXAMPLE 1

A circular cut of 25μ in depth was formed on the flange of the main body obtained in Example 1, at a position of 1 mm apart from the innermost portion of the flanage toward the outermost portion. The resulting main body was heat-sealed with the same lid as used in Example 1, under the same conditions to prepare a sealed container. 50 sealed containers obtained thus were measured for openability and puncture pressure in the same manner as in Example 1, and the results are shown in Table 1.

TABLE 1

|  | Puncture pressure (kg/cm$^2$) | | Openability |
| --- | --- | --- | --- |
|  | Average | Dispersion range | Defective (%) |
| Example 1 | 0.9 | 0.2 | 0 |
| Comparative Example 1 | 1.2 | 0.5 | 25 |

EXAMPLE 2

A multi-layer sheet of 750μ in total thickness consisting of (a) a sealing layer made of a high density polyethylene having a thickness of 40μ and (b) an adjacent layer made of a polypropylene, was subjected to vacuum molding to obtain a container main body having an inside diameter of 65 mm, an outside diameter of the flange portion of 75 mm and a height of 25 mm. In this main body, the lamination strength between the sealing layer and the adjacent layer was 1,500 g/25 mm width.

Then, microdents were formed in a width of 1.5 mm on the innermost circumferential portion of the sealing layer of the flange by using an ultrasonic phone provided with a head having a number of microprojections at pitch intervals of 0.6 mm.

The ultrasonic treatment was effected under the conditions of an output of 2 kw (energy used: 225 j), a pressure of 338 kpa and a period of time of 0.3 sec to form microdents having a depth of 120μ, in dots.

There was used a lid obtained by dry-laminating an oriented polyamide film (thickness: 30μ) to a high density polyethylene film as a sealing layer (the same material as used for the sealing layer of the main body) (thickness: 50μ).

The sealing layer of the lid was contacted with the sealing layer of the flange portion of the main body, and heat sealing was effected two times under the conditions of a surface pressure of 2 kg/cm$^2$, a temperature of 190° C. and a period of time of 1 sec to obtain an easily openable sealed container of the present invention.

For each of 50 sealed containers obtained thus, the lid was undone. In all the containers, opening was stable and smooth, and the opened surfaces showed very good condition.

COMPARATIVE EXAMPLE 2

A circular cut of 50μ in depth was formed on the flange of the main body obtained in Example 2, at a position of 1 mm apart from the innermost portion of the flange toward the outermost portion.

The resulting main body was heat-sealed with the same lid as used in Example 2, under the same conditions to prepare a sealed container.

For each of 50 sealed containers obtained thus, the lid was undone. About 20% of the containers gave uncomfortable feeling in peeling (opening), because of position shift in formation of the cut, position shift in heat sealing, etc. Most of these defective containers gave stringing on the opened surfaces and had poor appearance.

EXAMPLE 3

A multi-layer sheet of 750μ in total thickness consisting of (a) a sealing layer made of a high density polyethylene having a thickness of 40μ and (b) an adjacent layer made of a polypropylene, was subjected to vacuum molding to obtain a container main body having an inside diameter of 65 mm, an outside diameter of the flange portion of 75 mm and a height of 25 mm. In this main body, the lamination strength between the sealing layer and the adjacent layer was 1,500 g/25 mm width.

Then, microdents were formed in two ring shapes each at a width of 1.5 mm on the innermost and outermost circumferential portions of the sealing layer of the flange having an inverted L shape in the section by using an ultrasonic phone provided with a head having a number of mciroprojections at pitch intervals of 0.6 mm.

The ultrasonic treatment was effected under the conditions of an output of 2 kw (energy used: 225 j), a pressure of 338 kpa and a period of time of 0.3 sec to form microdents having a depth of 120μ, in dots.

There was used a lid obtained by dry-laminating an oriented polyamide film (thickness: 30μ) to a high density polyethylene film as a sealing layer (the same material as used for the sealing layer of the main body) (thickness: 50μ).

The sealing layer of the lid was contacted with the sealing layer of the flange portion of the main body, and heat sealing was effected two times under the conditions of a surface pressure of 2 kg/cm$^2$, a temperature of 190° C. and a period of time of 1.0 sec to obtain an easily openable sealed container of the present invention.

For each of 50 sealed containers obtained thus, the lid was undone. In all the containers, opening was stable and smooth, and the opened surfaces showed very good condition.

COMPARATIVE EXAMPLE 3

Two circular cuts each of 50μ in depth were formed on the flange of the main body obtained in Example 3, at positions of 1 mm outside from the innermost circumferential portion of the flange and of 1 mm inside from the outermost circumferential portion of the flange.

The resulting main body was heat-sealed with the same lid as used in Example 3, under the same conditions to prepare a sealed container.

For each of 50 sealed containers obtained thus, the lid was undone. About 30% of the containers gave uncomfortable feeling in peeling (opening), because of position shift in formation of the cuts, position shift in heat sealing, etc. Most of these defective containers gave stringing on the opened surfaces and had poor appearance.

EXAMPLE 4

There was prepared, by co-extrusion, a two-layer sheet of 850μ in total thickness consisting of (a) a sealing layer made of a high density polyethylene (HDPE) having a density of 0.955 and a melt index (MI) of 5 g/10 min and (b) an adjacent layer, which serves also as an outer layer, made of a polypropylene (PP) having a melt index of 0.5 g/min. The sheet was subjected to vacuum molding to obtain a container main body having an inside diameter of 65 mm, an outside diameter of the flange portion of 75 mm and a height of 25 mm. In the main container, the thickness of the sealing layer was 20μ and the lamination strength between the sealing layer and the adjacent layer was 1,500 g/25 mm width.

An oriented polyamide film was dry-lamianted to a high density polyethylene film (thickness: 50μ) as a sealing layer (the same polyethylene as used for the sealing layer of the main body) to obtain a sheet of 0.5 mm in thickness. The sheet was molded to a shape of a lid having a depression at the inner portion.

The sealing layer of the lid having a depression at the inner portion was contacted with the sealing layer of the flange of the main body. They were subjected to ultrasonic sealing using an ultrasonic phone provided with a head having a number of microprojections (pitch intervals: 0.6 mm, number of mciroprojections: 256/cm$^2$), under the conditions of an output of 2 kw (energy used: 225 j), a pressure of 450 kpa and a period of time of 0.3 sec, to obtain an easily openable sealed container wherein the lid is a type having a depression at the inner portion and the flange has a number of microprojections on the whole surface.

For each of 50 sealed containers obtained thus, the lid having a depression at the inner portion was undone. In all the containers, peeling had no feeling of resistance, opening was stable and smooth to the last moment, and the opened surfaces had no fluffing and no deformation.

The sealed containers were also measured for puncture pressure in the same manner as in Example 1. The average puncture pressure was 0.4 kg/cm$^2$, the dispersion range was 0.2 kg/cm$^2$, and accordingly the pressure resistance was stable and good.

COMPARATIVE EXAMPLE 4

The sealing method employed in Example 4 was changed to heat sealing. Sealing between the sealing layer of the flange of the main body and the sealing layer of the lid having a depression at the inner portion was impossible.

EXAMPLE 5

There was prepared, by co-extrusion, a two-layer sheet of 850μ in total thickness consisting of (a) a sealing layer made of a HDPE having a density of 0.955 and a MI of 5 g/10 min and (b) an adjacent layer, which serves also as an outer layer, made of a PP having a MI of 0.5 g/min. The sheet was subjected to vacuum molding to obtain a container main body having an inside diameter of 65 mm, an outside diameter of the flange portion of 75 mm and a height of 25 mm. In the container main body, the thickness of the sealing layer was 20μ and the lamination strength between the sealing layer and the adjacent layer was 1,500 g/25 mm.

Then, the sealing layer of the flange of the main body was subjected to an ultrasonic treatment using an ultrasonic phone provided with a head having a number of microprojections (pitch intervals: 0.5 mm, number of microprojections: 400/cm$^2$), under the conditions of an output of 2 kw (energy used: 214 j), a pressure of 200 kpa and a period of time of 0.3 sec, to form a number of microdents of 60μ in depth, in dots on the whole portion of the flange.

An oriented PP film was dry-lamianted to a HDPE film (thickness: 50μ) as a sealing layer (the same polyethylene as used for the sealing layer of the main body) to obtain a sheet of 0.20 mm in thickness. The sheet was molded to a shape of a lid having a depression at the inner portion, having an inside diameter of 64 mm, an outside diameter of the flange portion of 75 mm and a depth of 5 mm.

The lid having a depression at the inner portion was contacted with the sealing layer of the flange portion having a number of microdents, of the main body. They were subjected to heat sealing two times under the conditions of a surface pressure of 2 kg/cm$^2$, a temperature of 200° C. and a period of time of 1.5 sec to obtain an easily openable sealed container of the present invention.

For each of 50 sealed containers obtained thus, the lid having a depression at the inner portion was undone. In all the containers, peeling had no feeling of resistance, opening was stable and smooth to the last moment, and the opened surfaces had no fluffing and no deformation.

The sealed containers were also measured for puncture pressure in the same manner as in Example 1. The average puncture pressure was 0.9 kg/cm$^2$, the dispersion range was 0.2 kg/cm$^2$, and accordingly the pressure resistance was stable and good.

COMPARATIVE EXAMPLE 5

A circular cut of 50μ in depth was formed on the flange of the main body obtained in Example 5, at a position of 1 mm apart from the innermost portion of the flange toward the outermost portion. The resulting main body was heat-sealed with the same lid having a depression at the inner portion, as used in Example 5, under the same conditions as in Exampel 5, to prepare a sealed container.

For each of 50 sealed containers obtained thus, the lid was undone. About 25% of the containers gave uncomfortable feeling in peeling (opening), because of position shift in formation of the cut, position shift in heat sealing, etc. Most of these defective containers gave stringing on the opened surfaces and had poor appearance.

Heat sealing was also effected at the portion of the flange outer than the cut so as not to cover the cut. When the sealing conditions were severe, there occurred cutting of edge by sealing plate and, when the sealing conditions were mild, pseudo-sealing occurred. Thus, no sealed container having sufficient sealing was obtained.

EXAMPLE 6

There was prepared, by co-extrusion, a two-layer sheet of 250μ in total thickness, consisting of (a) a sealing layer made of a PP having a MI of 0.5 g/min and (b) an adjacent layer, which serves also as an outer layer, made of a HDPE having a density of 0.955 and a MI of 5 g/10 min. The sheet was subjected to vacuum molding to obtain a lid having a depression at the inner portion, having an inside diameter of 64 mm, an outside diameter of the flange portion of 75 mm and a depth of 5 mm. In the lid, the sealing layer had a thickness of 20μ and the lamination strength between the sealing layer and the adjacent layer was 1,500 g/25 mm width.

To the sealing layer side of the lid was applied an ultrasonic treatment using an ultrasonic phone provided with a head having a number of microprojections (pitch intervals: 0.5 mm, number of microprojections: 400/cm$^2$), under conditions of an output of 2 kw (energy used: 214 j), a pressure of 200 kpa and a period of time of 0.3 sec, to form a number of microdents having a depth of 45μ, in dots on the whole surface of the flange portion.

A main body having an inside diameter of 65 mm, an outside diameter of the flange portion of 75 mm and a height of 25 mm was obtained by injection-molding a PP. The flange portion of the main body was contacted with the sealing layer of the lid having microdents. They were heat-sealed twice under the conditions of a surface pressure of 2 kg/cm$^2$, a temperature of 200° C. and a period of time of 1.5 sec to obtain a sealed container of the present invention.

For each of 50 sealed containers obtained thus, the lid was undone. In all the containers, peeling had no feeling of resistance, opening was stable, and the opened surfaces had no fluffing and no deformation.

We claim:

1. An easily openable sealed container comprising: a lid and a main body having a flange portion; wherein
the main body consists of a multilayer sheet comprising a sealing layer and an adjacent contacting layer and said lid consists of a lid comprising a sealing layer, the lamination strength between the sealing layer of the main body and the adjacent contacting layer is 300-2,000 g/25 mm width, said sealing layer of the main body has a thickness of 10-100µ and has a number of microdents in said flange portion on a whole surface or on a ring-shaped part of the surface, and being sealed with the lid in the flange portion at a strength larger than said lamination strength.

2. An easily openable sealed container according to claim 1, wherein the microdents are formed in a number of dots which have a depth d relative to the thickness t of the sealing layer of the main body, of d=1t to 10t and which are arranged at pitch intervals of 0.3 mm to 0.8 mm, on the surface of the flange portion of the main body, in a ring shape of 1-3 mm width ranging from the innermost circumference of said surface to its outer circumference apart by said width.

3. An easily openable sealed container according to claim 1, wherein the microdents are formed in a number of dots which have a depth d relative to the thickness t of the sealing layer of the main body, of d=1t to 10t and which are arranged at pitch intervals of 0.3 mm to 0.8 mm, on the surface of the flange portion of the main body, in two ring shapes, one ring having a 1-3 mm width and ranging from the innermost circumference of said surface to its outer circumfernece apart by said width and the other ring having a 1-3 mm width and ranging from the outermost circumference of said surface to its inner circumference apart by said width.

4. An easily openable sealed container according to claim 1, wherein the lid is a film or has a depression at an inner portion.

5. An easily openable sealed container according to claim 1, wherein the section of the flange portion has an inverted reverse L shape.

6. An easily openable sealed container comprising: a lid and a main body having a flange; wherein
said lid consists of a multilayer sheet of at least two layers comprising a sealing layer and an adjacent contacting layer and said main body consists of a main body comprising a sealing layer, the lamination strength between the sealing layer of the lid and the adjacent contacting layer is 300-2,000 g/25 mm width, said sealing layer of the lid has a thickness of 10-100µ, portions of the lid corresponding to a whole or part of the flange portion of the main body have a number of microdents, and the whole surface of the flange portion of the main body and the corresponding portion of the lid are heat sealed, after the main body has been filled with contents, at a strength larger than said lamination strength.

7. An easily openable sealed container according to claim 6, wherein the lid is a film-like multi-layer sheet which has a transparent or opaque smooth surface.

8. An easily openable sealed container according to claim 6, wherein the lid is a transparent or opaque multilayer sheet the section of which has an inverted T or inverted U shape.

9. An easily openable sealed container according to claim 6, wherein the microdents are formed on the surface portion of the sealing layer of the lid corresponding to a whole flange portion of the main body.

10. An easily openable sealed container according to claim 6, wherein the microdents are formed on the surface portion of the sealing layer of the lid corresponding to an innermost portion of the flange of the main body, in a ring shape.

11. An easily openable sealed container according to claim 6, wherein the microdents are formed on surface portions of the sealing layer of the lid corresponding to innermost and outermost portions of the flange of the main body, in two ring shapes.

* * * * *